United States Patent Office 3,460,421
Patented Aug. 12, 1969

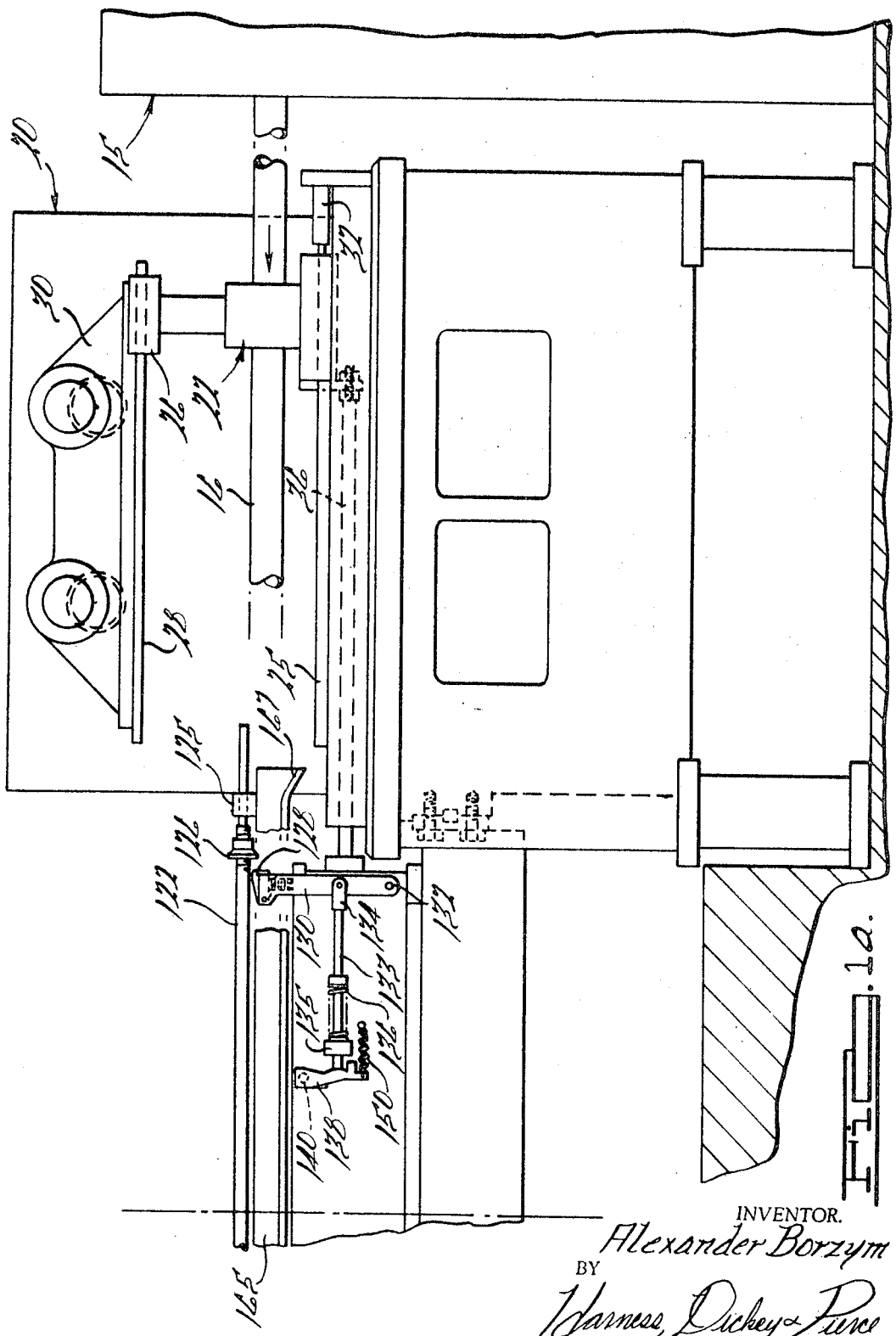

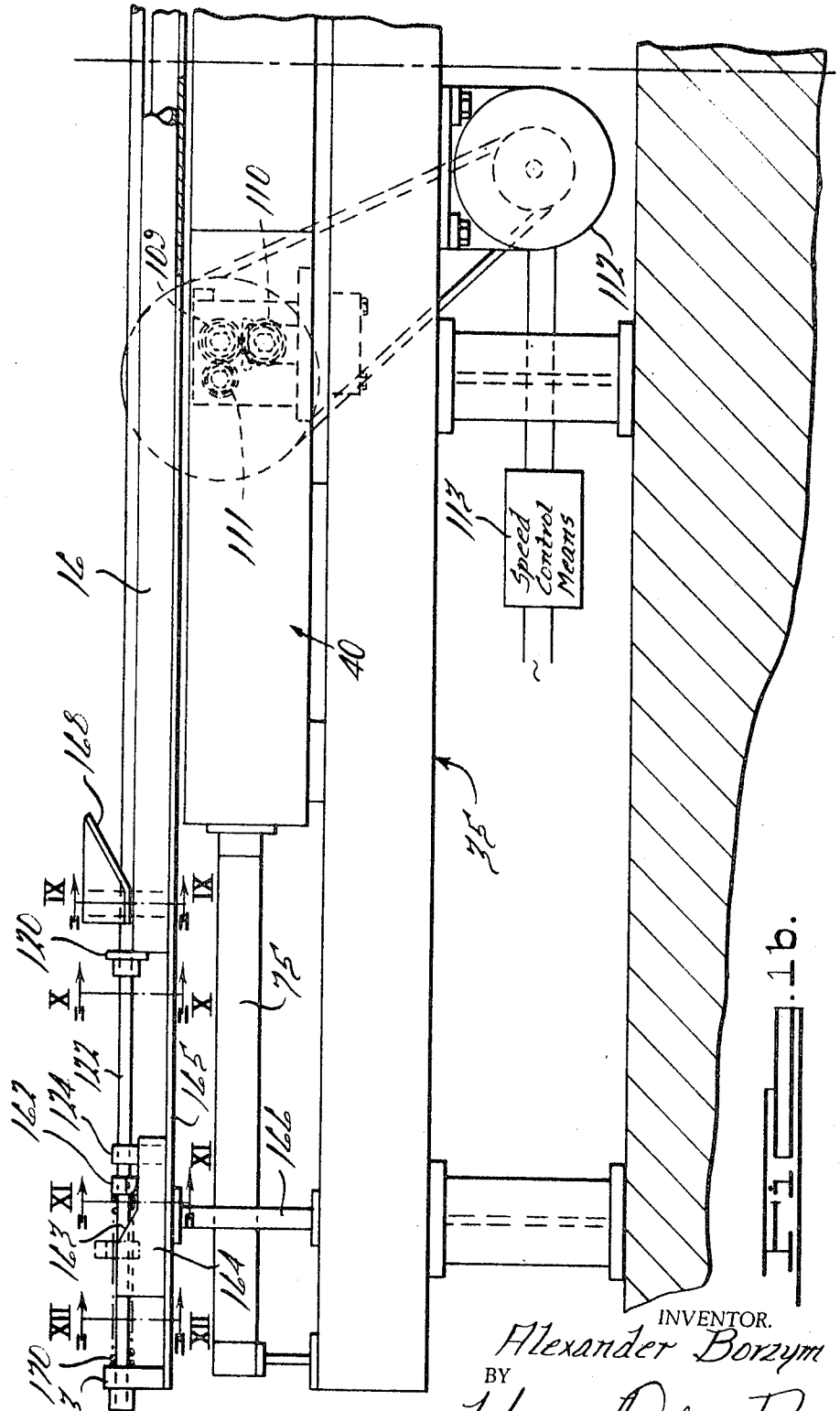

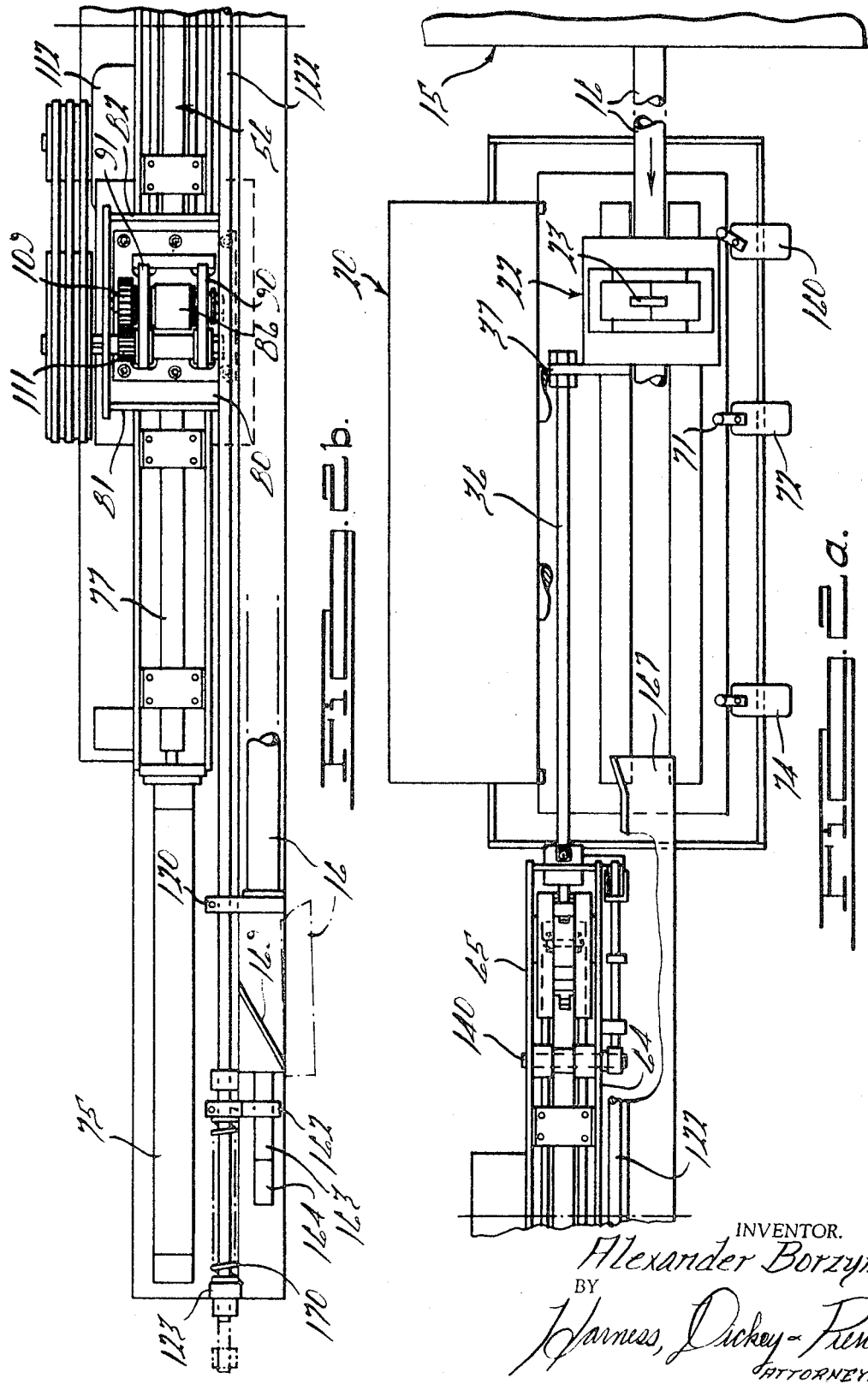

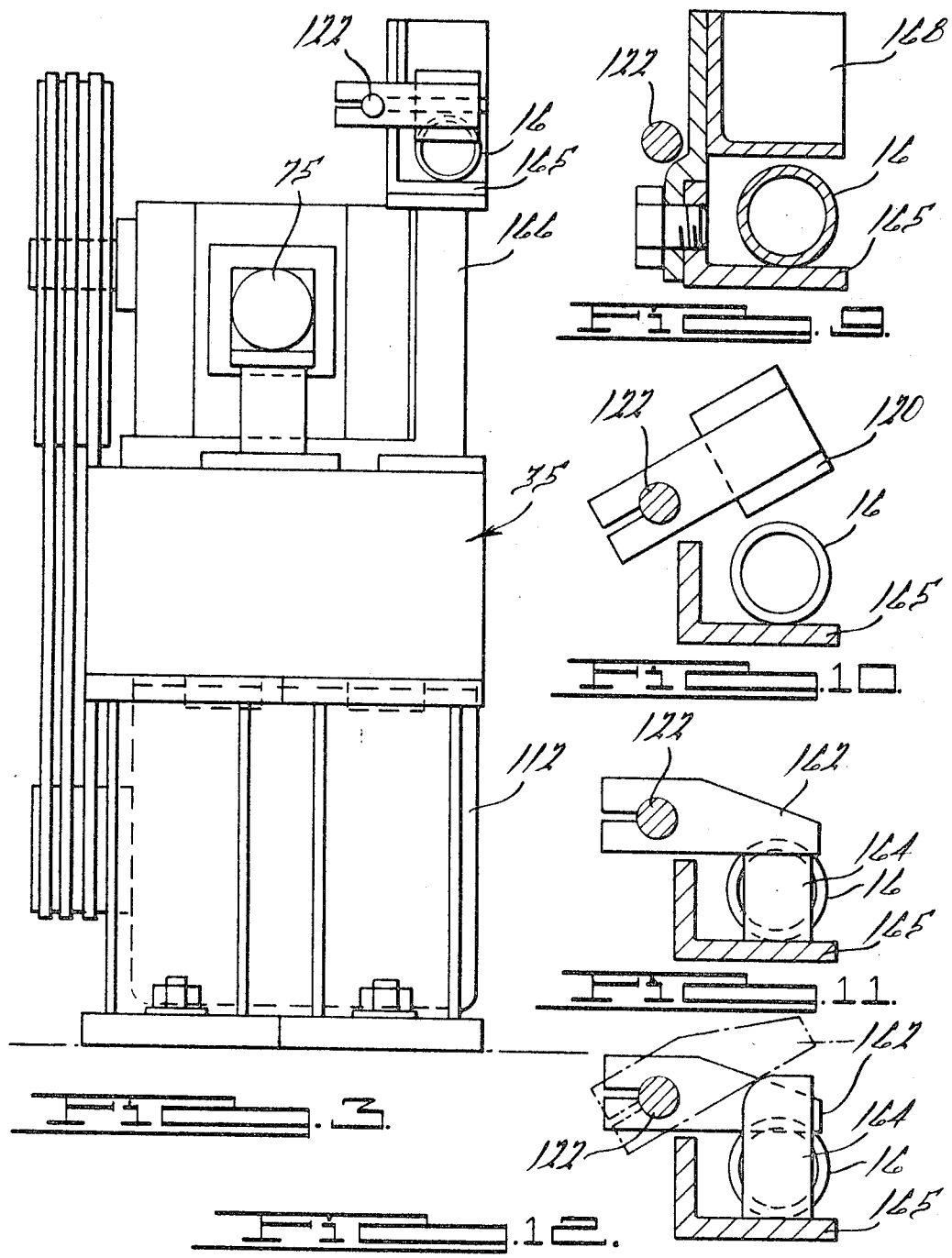

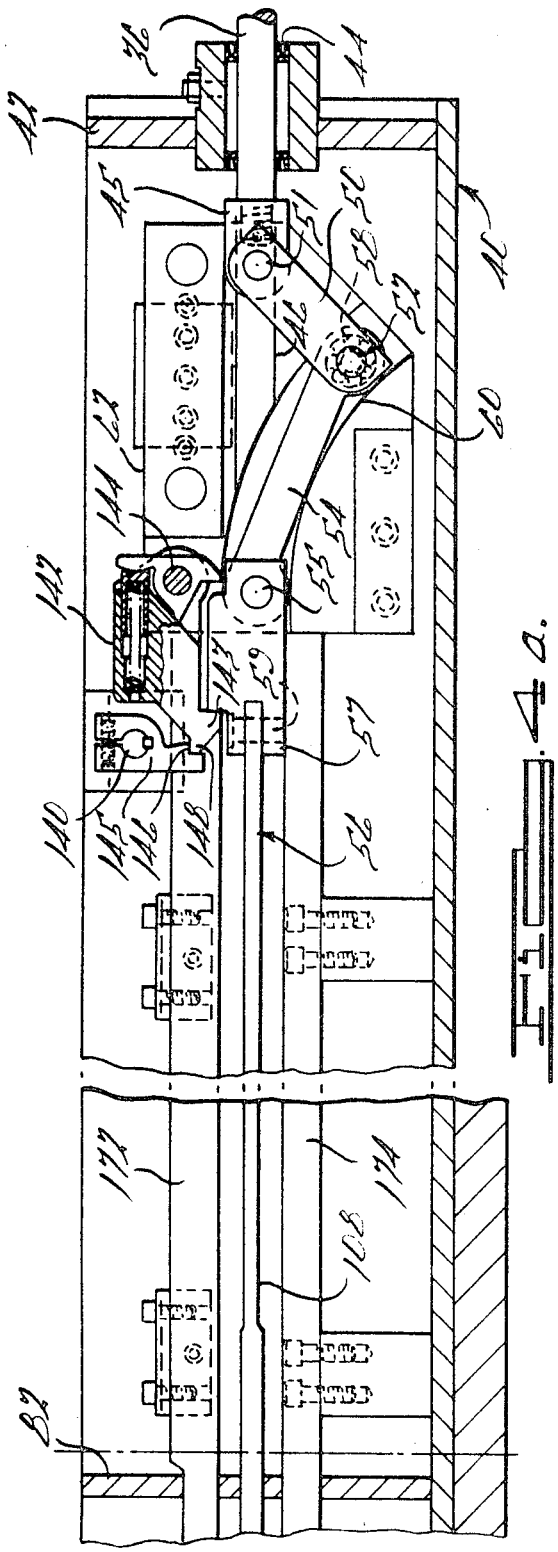

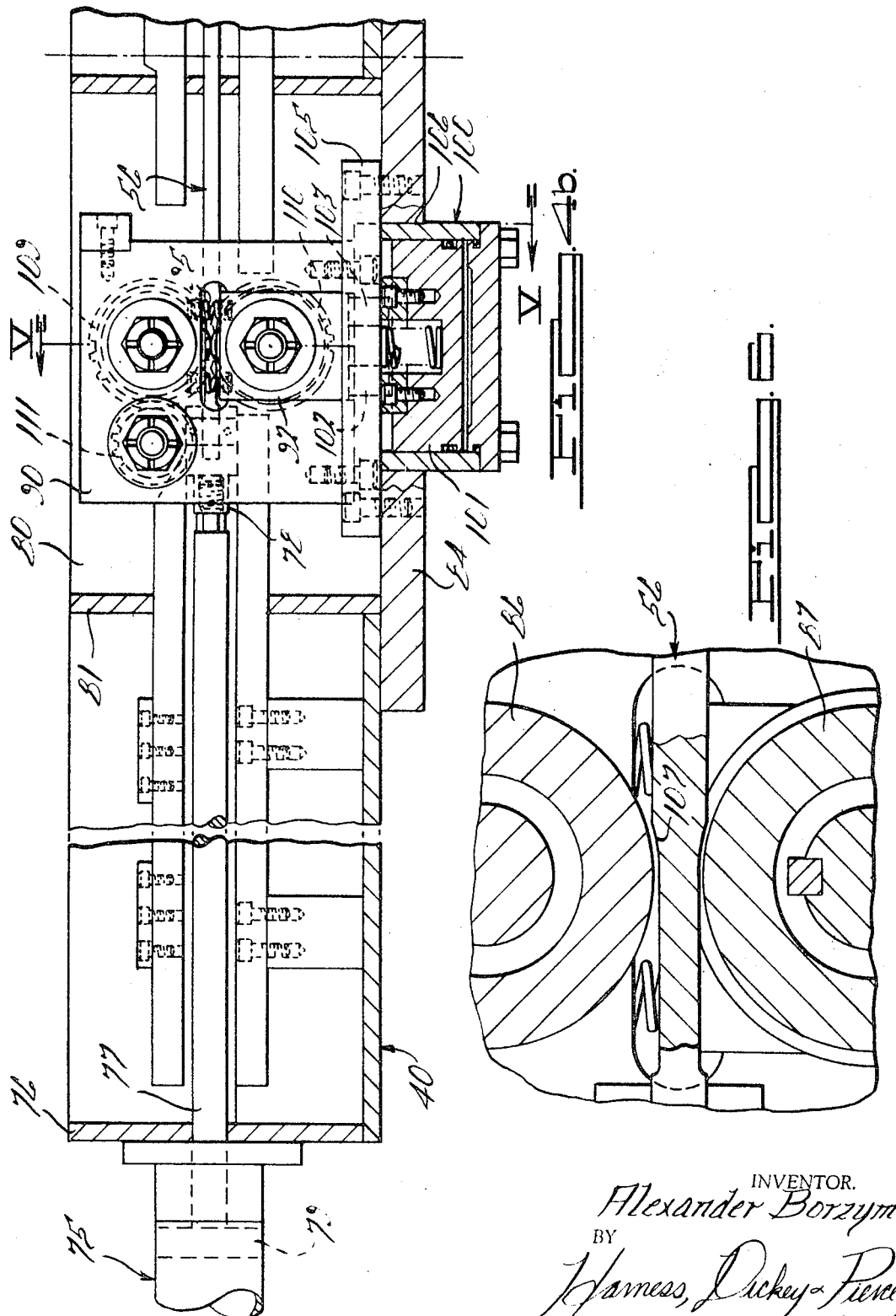

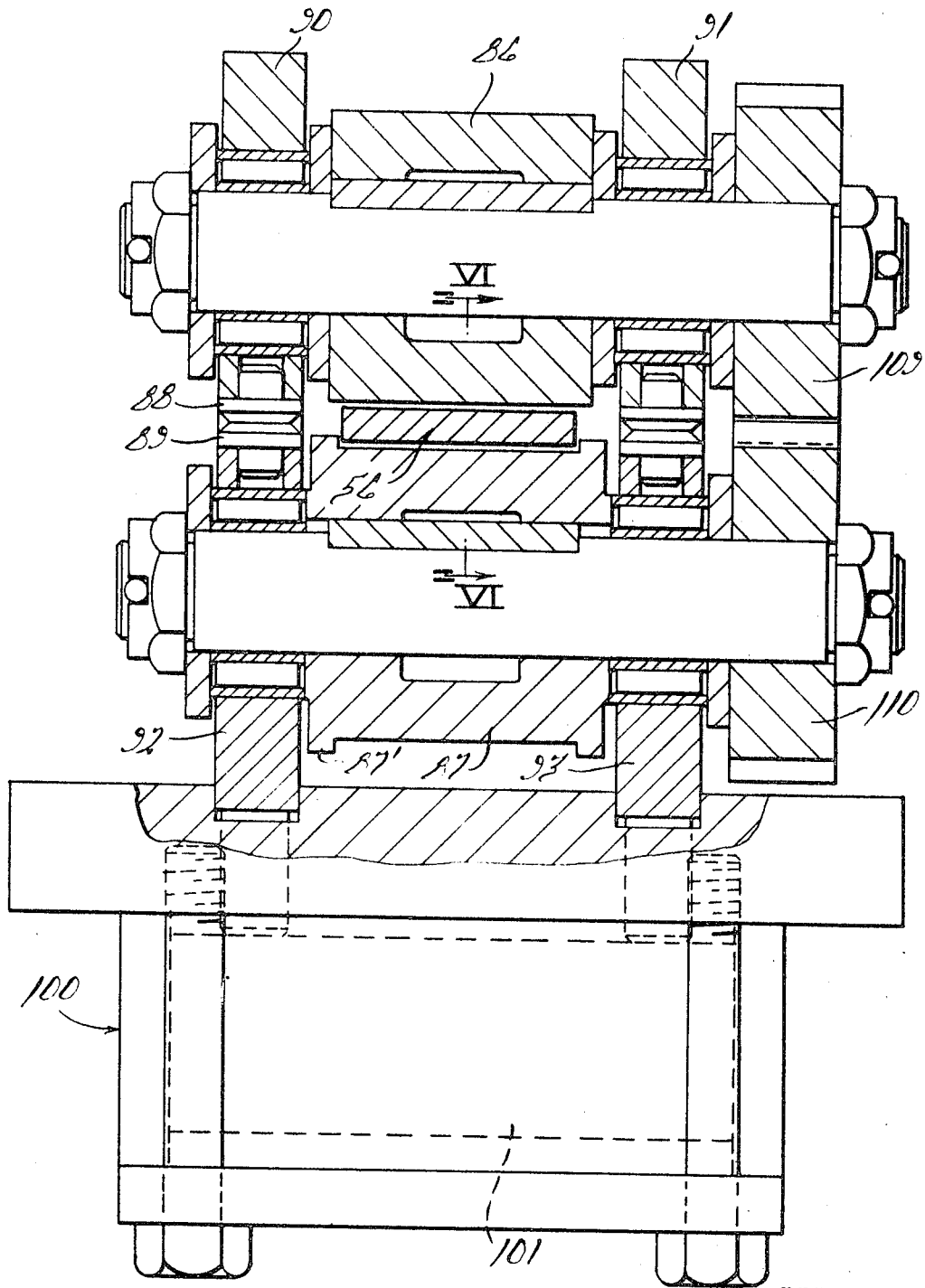

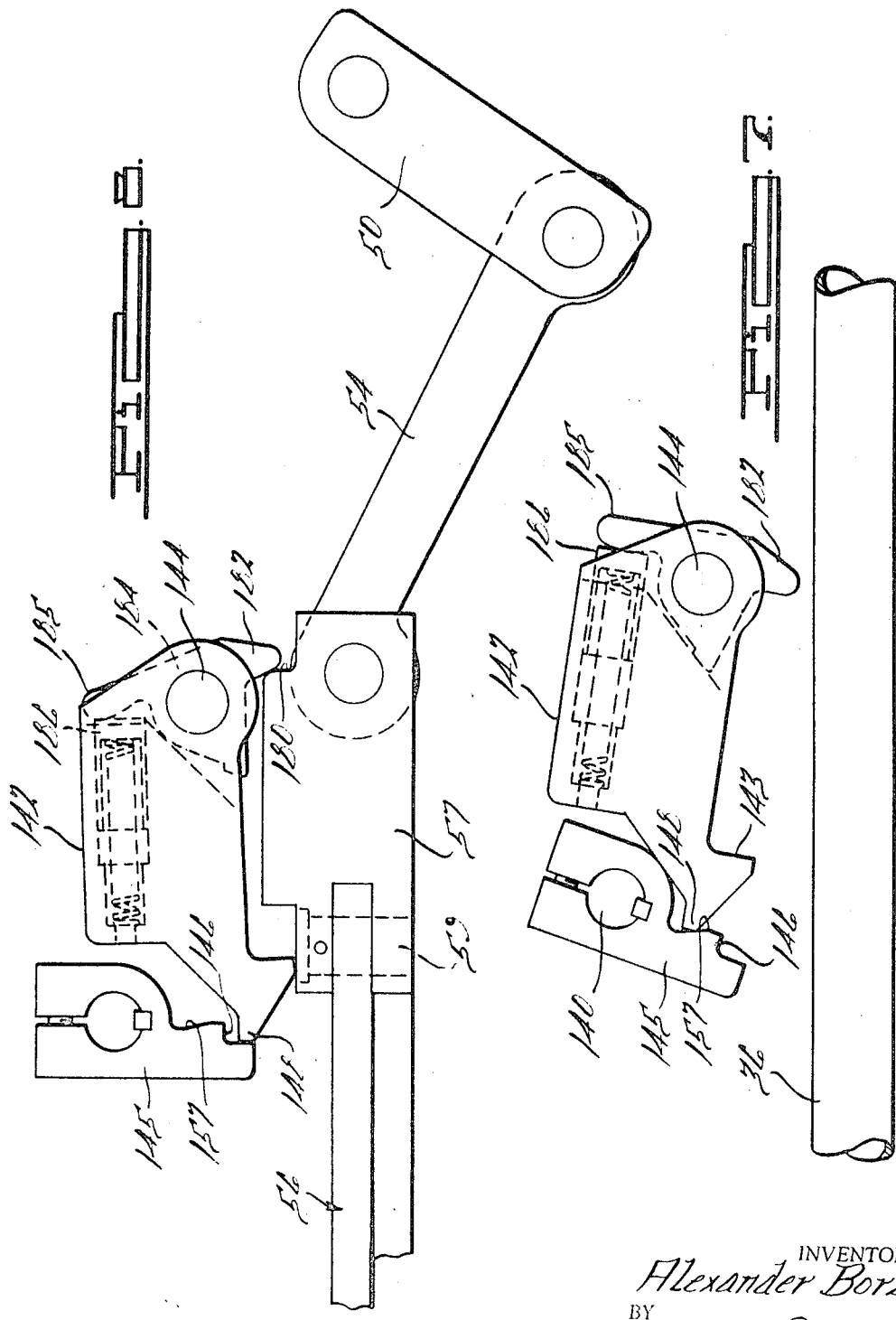

3,460,421
POWER DRIVE FOR MACHINE ELEMENTS
Alexander Borzym, 6841 Oakman Blvd.,
Dearborn, Mich. 48126
Filed Sept. 1, 1966, Ser. No. 576,733
Int. Cl. B23d 59/00, 45/20
U.S. Cl. 83—311        11 Claims

ABSTRACT OF THE DISCLOSURE

An accelerator for the carriage of a machine for cutting work on the fly is powered by two driving means, one an air cylinder connected to the carriage by a flat bar and the other a pair of cylindrical rolls engaging opposite sides of the bar and timed to rotate synchronously with the flying work to control the speed of the carriage. At a start position the bar is slightly displaced longitudinally from driving engagement with the rolls and latched against movement toward the rolls but the air cylinder is charged and urging the bar toward the rolls.

Background of the invention

The present invention relates to power drives, particularly for machine elements such as the traveling carriages or sliding die assemblies of flying shears and the like.

In flying shears for severing elongated work such as metal tubing while the work is being discharged from a tube mill or forming machine and without interrupting the travel of the work, a carriage is commonly used comprising a cutoff die assembly which must be reciprocated in such manner that while traveling in one direction its speed is synchronized accurately with that of the work, at least during the performance of the severing or other operation. Tubing discharged from modern tube mills frequently travels at a rate of several hundred feet per minute, and in order to enable cutting the work into relatively short lengths, it is necessary to accelerate the carriage quickly, hold it at synchronous speed long enough for performance of the severing operation, but no longer than is necessary, and then return it quickly to the starting position. Since the mass of the carriage is substantial, auxiliary means in the form of a device referred to in the trade as an "accelerator," is commonly employed to actuate the carriage, both to bring it to synchronous speed, and to return it to the starting position. As the output speeds of tube mills have increased, the problems involved in accelerating the cutoff die carriage to synchronous speed and holding it at such speed for a proper period of time and then returning the die carriage to the starting position quickly enough to enable cutting tubing to desired lengths, have grown to severe proportions. The object of the present invention is to provide an improved and simplified device of the indicated character which is compact, rugged and reliable.

Other objects and advantages will be apparent upon consideration of the present dislosure in its entirety.

Detailed description of the preferred form of the invention

In the drawing:

FIGURES 1a and 1b are the right and left portions, respectively, of a front elevational view illustrating a preferred embodiment of my invention, and may be read in transversely aligned relation, some typical environmental structure also being shown;

FIGURES 2a and 2b are top plan views respectively, showing the right and left portions of the same structure and intended to be read in similar transversely aligned relationship;

FIGURE 3 is an end elevational view taken as viewed from the left of FIGURE 1b;

FIGURES 4a and 4b are a composite vertical longitudinal sectional view of the right and left portions respectively of my preferred carriage actuating mechanism, shown on a larger scale and partially broken away;

FIGURE 5 is a vertical sectional view on a larger scale taken substantially on the line V—V of FIGURE 4b and looking in the direction of the arrows;

FIGURE 6 is a fragmentary and somewhat diagrammatic cross sectional view taken substantially on the line VI—VI of FIGURE 5 and looking in the direction of the arrows;

FIGURES 7 and 8 are fragmentary side elevational views of the latch mechanism and adjacent parts in different operative positions, and FIGURES 9, 10, 11 and 12 are detailed sectional views taken respectively on the lines IX—IX, X—X, XI—XI and XII—XII of FIGURE 1b and looking in the direction of the arrows.

Referring now to the drawing, reference character 15 designates generally a work source in the form of a tube mill for the continuous production of metal tubing which is indicated at 16 and which is presumed to be continuously traveling at a substantial speed in the direction of the arrow applied thereto. Reference numeral 20 designates generally a machine which is illustrated as a flying shear of the type disclosed in my copending United States Patent 3,288,012 granted Nov. 29, 1966, and which is equipped with a carriage in the form of a die assembly 22 which reciprocates horizontally with and counter to the work 16 and while synchronized with the work severs the same by means of a blade 23 which is intermittently driven downwardly through the work, to cut it into sections of desired length, in response to descent of the ram 30. The cutoff die carriage travels on tracks 25 on the bed of the machine and a vertically reciprocatory blade-actuating upper portion 26 of the carriage is also slidably interengaged with tracks 28 carried by the ram 30 of the machine so that as the ram moves downwardly the cutoff blade engages and severs the work while when the head is raised the blade is free of the work. The carriage also includes a chuck (not shown) which engages the work during the time that the blade is interengaged with the work but is released when the blade is clear of the work.

My improved accelerator is adapted to be installed upon a runout table generally designated 35, located on the discharge side (shown at the left) of the shear and imparts reciprocatory driving power to the carriage 22 by means of a rod 36 the right end of which is attached to the carriage 22 by means of a bracket 37.

The actuating rod 36 is driven by two power sources which are coordinated by mechanism housed within an elongated casing generally designaed 40 secured to the top of the table 35 near the back and constructed as an oil-tight open-topped multisectioned box formed of welded plates. The casing sections are preferably provided with fluid-tight covers (not shown).

As best shown in FIGURE 4a, the actuating rod 36 enters the right end wall 42 of the casing through a lubricant retainer assembly 44, its end within the casing being tightly secured to a fitting 45. The fitting 45, reciprocable with the rod 36 and slidably supported in trackway portions 46 and 172–174 carried by the side walls of the casing, is connected by pivot pin 51 to a link 50 which is inturn articulated by pin 52 to a link 54 connected by pivot pin 55 fitting 57 and pin 59 to a bar 56 of flattened rectangular cross section. The pins 51, 52 and 55 are all on parallel horizontal transverse axes. Pin 52 extends transversely beyond the sides of the articulated links 50–54 and carries antifriction bearing 58 acting as guide rollers and which, near the right end of their travel, move in curved slots 60 formed in the inner faces of vertical longitudinal plates 62 carried on the inner faces of the side walls 64, 65 of the casing.

When the carriage 22 is in its starting position which is at the right, as shown in FIGURE 1a, and prior to initiation of its acceleration to the left, the bar 56 is at the right end of its travel, as shown in FIGURE 4a, and the links 50–54 are at an angle to one another, as shown in the latter view. In order to accelerate the carriage to the left, power is applied to bar 56 to move it to the left, by means presently to be described, and during the first portion of such powered actuation, tension is applied to link 54, so that the links 54–50 tend to straighten and the component of leftward force imposed upon the rod 36 is increased relatively gradually until the links reach the straight line position. During such straightening, the axis of articulation defined by pin 52 is guided by the slots 60, which are curved upwardly and gradually toward the left so that the linkage cannot straighten immediately and the slots act as a cam means to accelerate the rod 36 relatively gradually until, as the pin 52 reaches the upper left extremity of the curved slots 60, the rod 36 has reached the full speed of the bar 56, and during continuing leftward movement, rod 36 and bar 56 move at the same speed. During such continuing leftward movement rollers 58 travel between side rails 172, 174.

After the linkage has thus straightened and the bar 36 has reached the full speed, the carriage 22 strikes the actuating arm 71 of an electric switch 72 which when so actuated acts (by means not shown and well known in the art) to engage the main driving clutch of the machine, which thereupon immediately applies power to the ram 30 causing the ram to descend and sever the work and then rise while the carriage continues its leftward movement. The ram then stops in the raised position while the carriage continues to the limit of its leftward travel, which in the illustrated instance corresponds approximately to the position of another switch 74 which, when tripped by the carriage, initiates the powered return of the carriage to the initial position.

Power for initiating leftward movement of the carriage and connected parts is derived from an air cylinder assembly generally designated 75 secured to and extending longitudinally from the left end wall 76 of the casing assembly. A piston 79 in the air cylinder assembly is connected by a piston rod 77 and coupling 78 to the bar 56.

A central section 80 of the casing is segregated from the remainder thereof by a pair of spaced vertical transverse partition walls 81, 82. Section 80 is somewhat deeper front to back than the remainder of the casing, as best shown in FIGURE 2b. Section 80 contains a double roll mechanical drive mechanism supported upon a base plate 84 which plate also forms an oil-tight closure for the bottom of section 80. The drive roll assembly comprises a pair of smooth-surfaced cylindrical hardened steel rolers 86, 87 which are adapted to be urged toward each other to the extent of a predetermined spaced relationship, the determination of such spacing being effected by spacer buttons 88, 89. It will be noted that the upper roll 86 is journaled on a fixed axis in side plates 90, 91. The bottom roll 87 is journaled in blocks 92, 93, block 92 being vertically slidable in side plate 90 and block 93 vertically slidable in side plate 91. The rollers are urged apart by compression springs 95, a pair of which is provided for each of the blocks 92, 93, reacting downwardly thereagainst. The lower roll is movable upwardly by means of air under pressure acting within an air cylinder and piston assembly generally designated 100 mounted in and depending from the base plate 84. The piston assembly 101 is arranged to bear upwardly against both of the blocks 92, 93, a pair of thrust pins 102, 103 being provided beneath each of the blocks 92, 93 resting on top of the piston assembly. The side plates 90, 91 and the air cylinder assembly 100 are formed as a subassembly secured to the top and bottom respectively of a mounting plate 105 which overlies and seals an opening 106 in the base plate 84 through which the air cylinder depends. The air cylinder is thus readily accessible from beneath the table for servicing of the unit or its connections.

Except near its left and right extremities, the thickness of the bar 56 slightly exceeds the minimum roll spacing delimited by buttons 88, 89 so that when the rolls 86, 87 are urged toward one another by pressure beneath the piston 101 they frictionally engage the surface of the bar. At the extreme left end of the bar 56, however, the vertical thickness of the bar is reduced, in an area designated 107 in FIGURE 6, to an extent such that when thinned section 107 lies between the rolls 86, 87, the rolls cannot engage the bar. As soon as the bar begins to move to the left from the extreme right hand limit of its movement, the thicker section enters the space between the rolls and the rolls then engage the bar. The full thickness of the bar 56 extends to the right far enough so that the rolls engage the bar during that portion of the entire leftward movement of the carriage which occurs while the cutter blade is in engagement with the work. After the blade has been lifted far enough to clear the work, however, the bar 56 has traveled far enough to the left to bring a right hand thinned portion 108 of the bar into the space between the rolls, again effectively interrupting driving connection between the rolls and the bar, and permitting the air cylinder to drive the carriage at maximum speed to the end of its travel.

The rolls 86, 87 are geared together for synchronous rotation by meshing end gears 109, 110. Gear 109 is drivable by a drive gear 111 powered by drive means of a nature which provides accurate speed control. For purposes of illustration this is shown as a direct current electric motor 112, the speed of which is regulated by speed controlling means 113 operatively coupled to speed sensing means (not shown) at the mill. Such drivers and speed control means being well known, a detail description thereof will not be required.

As shown in FIGURE 5, the bottom roll 87 may be provided with somewhat enlarged end flanges 87' which hold the bar 56 against lateral displacement, but as previously indicated, both the bar and the bar engaging surfaces of the rolls are smooth. The air cylinder 100 develops enough force at the rolls to prevent slip between bar and rolls, and the rolls thus act as speed-limiting means. The system preferably operates in an effectively oil-coated condition. I preferably pump oil into the assembly through a suitable oil discharge jet (not shown), which discharges oil against the rolls and the bar 56 in the bar-engaging area so as to keep the engaging surfaces well coated, and the excess oil lubricates the remaining components by splash, so that it is not necessary to maintain a substantial depth in the casing and the oil is simply pumped from the bottom and recirculated.

The remaining components of the mechanism may best be considered in connection with a description of the operation:

With the system in the condition illustarted in FIGURES 1a and 1b, the chuck jaws in the cutoff die carriage are open, the carriage and connected parts are stationary at the right, and the work 16 is moving freely toward the left through the jaws and carriage. The work continues such free leftward movement until the leading end of the work strikes the flag 120. Flag 120 is fastened to rod 122 slidably supported in brackets 123, 124, 125. The leftward movement imparted to the flag by the work pulls to the left an adjustable abutment 126 secured to the rod 122 near the right end. Abutment 126 thereupon engages a latch member 128 carried by arm 130 pivotally supported at its lower end as at 132 on the front face of the front wall 64 of the casing assembly and upstanding in such position that arm 130 will be rocked to the left at such time. A rod 133 pivotally connected by a clevis 134 to the arm 130 is thereby moved to the left through a support bracket 135 in which rod 133 is slidable and against the effort of a compression spring 136, thereby rocking to the left and in a clockwise direction an arm 138 fast on a cross shaft 140 which extends through and is journaled in the front and rear walls 64, 65 of the casing. At such time air under full pressure is on the right side of the piston 79 and beneath piston 101, but the bar 56 and rod 36 are held at the extreme right limits of movement by a latch member 142 having a depending tooth portion 143 engaged behind the vertical left end wall of the fitting 57.

Latch member 142 is pivoted near its other end on a transverse shaft 144 spaced above the area of engagement between the tooth and fitting. A locking dog 145 fast on shaft 140 has a tooth portion 146 which in one position overlies a shoulder 148 on latch member 142 to hold the latch member down and thereby hold the tooth 143 over-engaged with fitting 57. Locking dog 145 is normally yieldably maintained in such position by a tension spring 150 acting in a counterclockwise direction on shaft 140 through the arm 138 (FIGURE 1a). When arm 138 is moved clockwise by the engagement of abutment 126 with latch member 128 of arm 130 as previously described, dog 145 is moved clockwise (FIGURE 4a) releasing latch member 142. Since the air pressure is exerting leftward force on the bar 56 and fitting 57 and the engagement of fitting 57 with the tooth 143 is below the axis of pin 144, a rocking couple is then exerted on latch member 142, immediately lifting it so that the fitting 57 can slide under the latch member. The rod 36 is thereby accelerated to the left by the air cylinder 75 as the linkage 50, 54 straightens in the manner previously described and accelerates the carriage 22 toward the left. Very quickly after commencement of the leftward movement of the bar 56, its portion of full thickness at the right extremity of the thinned section 107 (FIGURE 6) enters the gripping rolls 86, 87, which are under pressure and rotating at the desired synchronous speed. Air pressure is always applied beneath the piston 101 when the air pressure is on the right side of the piston 79. The drive of rolls 86, 87 is positive and irreversible, so that the rolls not only supply power to the bar but positively prevent the bar, and thereby the carriage, from moving at a speed faster than, or at any other speed than, the work speed, and the carriage continues to the left under the joint action of the air cylinder and the mechanical roller drive.

As soon as the carriage reaches synchronous speed in its movement to the left it strikes and trips the switch arm 71, initiating movemnt of the ram for one complete cycle, comprising one down stroke and an upward return stroke. During such downward movement of the head the chuck jaws are automatically engaged with the work, the carriage travel now being synchronized with the work travel, and the cutoff occurs in the manner described and as disclosed in my aforementioned Patent 3,288,012. After the ram has returned to the raised position the carriage 22 reaches and strikes the trip arm of switch 74, which causes the air to be discharged from the right end of cylinder 75 and from the cylinder 100 beneath piston 101, and immediately applies air pressure to the left end of cylinder 75, cylinder 100 remaining vented at such time. The rolls 86, 87 are thereby separated by the springs 95, and the air pressure in the left end of cylinder 75 returns the carriage to the right while the ram remains raised, the chuck jaws open, and the tubing continues to advance. As the carriage reaches the right limit of its movement it strikes and trips a switch 160 which, by well known means, functions to exhaust the air from the left end of cylinder 75 and recharge the right end of cylinder 75, and also recharge cylinder 100 beneath piston 101.

When the fitting 57 moves to the left in the manner described from the initial position shown in FIGURE 4a, the latch member 142 is lifted from the position shown in FIGURE 4a to the position shown in FIGURE 7, and the nose formed by the extremity of shouldered portion 148 comes to rest against an inclined surface 157 on dog 145 above shoulder 146. At such time the dog 145 is being yieldably urged in a counterclockwise direction by spring 150 and latcth member 142 is thereby yieldably held raised, in the position shown in FIGURE 7.

The reason that the dog 145 is so released as to be free to exert the counterclockwise force against the nose portion at latch part 148 requires reference to FIGURES 1b and 2b. As the workpiece moves the flag 120 to the left, a follower arm 162 fast on the slide rod 122 is thereby caused to ride up an inclined portion 163 of a fixed cam 164 secured to the top of the work guide track 165, along which the work moves over the runout table. The work guide track 165 is supported on suitable pedestals as 166 throughout the effective length of the table and the work is guided and held down in known manner as by suitable guide and holddown portions 167, 168. As the follower arm 162 rides up the cam surface 163, traveling from the full line position to the dotted line position shown in FIGURE 1b, it rocks the rod 122 about its axis in a direction to lift the flag 120 free of the work. At the same time the now-severed workpiece is guided off the table by an inclined work guiding portion 169 and falls away to a desired destination, and the rod 122 and flag 120 and other connected parts are then returned to the right under the influence of a compression spring 170 trapped on the rod between left end bracket 123 and follower arm 162. The abutment 126 is thus moved to the right so that spring 150 is effective to act through arm 138, shaft 140 and dog 145 to hold latch member 142 raised. The fittings 57, 45 and link assembly may thus slide freely to the left beneath the latch member.

During the travel of the carriage and the rods and connected parts in both directions and while these parts are in positions such that bearing rollers 58 are to the left of curved track sections 60, the linkage 50–54 is held straight by reason of the fact that the bearing rollers 58 travel in the straight leftward extensions of curved tracks 60, formed by the space between the straight side rails 172, 174. Rails 172, 174 are fast upon the inner faces of the front and rear walls 64, 65 of the casing.

When, at the left end of its movement, the carriage trips switch 74, and air pressure is thereby applied to the left end of cylinder 75 and vented from the right end, and from cylinder 100, the carriage is thereby immediately moved to the right, and such return travel is not limited by the now separated rolls 86–87. As the carriage 22 approaches its right hand position the rollers 58 enter and move downwardly in curved slots 60 and the carriage trips switch 160 and then comes to rest against suitable stop means such as the hydraulic arrester 32 but the fitting 57 and bar 56 move slightly beyond the normal latched position shown in FIGURE 4a, to an over-travel position shown in FIGURE 8, causing a shoulder 180 on the front of fitting 57 to engage a downwardly extending toe portion 182 of a dog 184 freely pivoted on the pin 144 independently of the latch member 142. An upwardly extending arm 185 of dog 184 is thereby caused to react in a counterclockwise direction upon the latch member 142 through a spring pressed plunger 186, thereby forcing member 142 counterclockwise and free of the inclined friction holding portion 157, and moving tooth 143 downwardly to block and latch the fitting 57 against movement to the left. Locking dog 145 then snaps to the locking position in which shoulder 146 overlies tooth 148. The air pressure which is then returned to the right end of cylinder 75 by the means under control of switch 160, moves the fitting 57 back to the position shown in FIGURE 4a and the apparatus is ready for recommencement of the cycle described when the flag is next displaced to the left by the advancing work. Since the right end of the air cylinder is thus recharged as soon as the carriage has returned to the stop position, the air pressure is instantly effective to move the bar leftward into driving engagement with the rolls when the latch 143 is released from block 57.

The size and power of the air cylinder need not be great enough to supply all the driving force required to keep the die carriage moving at synchronous speed at all times and under all conditions, since if the power required at certain times is greater than the air cylinder can exert as for example when the chuck jaws are closing, the mechanical roller drive supplies the additional power. The smaller size of the cylinder also effects an important conservation in compressed air and returns the carriage more rapidly. Its size and design are governed by the carriage return requirements.

This detailed description of preferred form of the invention and the accompanying drawings, have been furnished in compliance with the statutory requirement to set forth the best mode contemplated by the inventor of carrying out the invention. The prior portions consisting of the abstract of the disclosure and the background of the invention are furnished without prejudice in an effort to comply with administrative requirements of the Patent Office.

I claim:

1. Means for accelerating and driving the carriage of a machine for operating upon elongated work on the fly comprising an air cylinder and piston assembly, a rod drivable by the piston and adapted to be connected to the carriage, timed mechanical speed-limiting means, the rod being movable with the carriage from a start position out of driving interengagement with the speed-limiting means to driving interengagement therewith during a short initial travel of said rod away from said start position, means for charging the cylinder in a direction to urge the piston and rod away from start position and toward interengaged relation with the speed-limiting means, and quick-releasable latch means for holding the piston, rod and carriage against such movement away from the start position.

2. Means as defined in claim 1 wherein the rod has parallel flats on opposite sides and the speed-limiting means includes a pair of opposed cylindrical rolls in frictional driving engagement with said flats.

3. In combination with means as defined in claim 2, means for interrupting operative frictional engagement between the rolls and the rod during movement of the rod in one direction.

4. Means as defined in claim 2 wherein said substantially flat surfaces are uniformly spaced from one another throughout a predetermined length engageable by the rolls and are relieved at an end area to prevent effective roll engagement in such area.

5. In combination with means as defined in claim 4, means for forcing the rolls toward one another and against said surfaces, and spacer means limiting movement of the rolls toward one another to a minimum spacing exceeding the thickness of the relieved area.

6. Means as defined in claim 5 wherein said substantially flat surfaces are parallel and uniformly spaced from one another throughout a predetermined length engageable by the rolls and are relieved at areas at both ends to prevent effective roll engagement in such areas.

7. An accelerator for the die carriage of a flying shear or the like comprising a cylinder and piston assembly arranged to drive the carriage alternately in one direction and then in the opposite direction, and mechanical speed-limiting means operatively interconnected with the carriage in one direction only of its travel, including a rod connecting said assembly to the carriage, said speed limiting means including positively driven rollers, and means for urging the rollers against the rod when the carriage is moving in one direction and away from the rod when the carriage is moving in the opposite direction.

8. Means for accelerating and driving the carriage of a machine for operating on elongated work on the fly including a bar having a flat surface extending longitudinally in the direction of carriage movement, a cylindrical roll for driving the bar by engagement with said flat surface, and mechanical means for driving the roll in timed relation to work which is on the fly through the machine.

9. In combination with means as defined in claim 8, means for drivingly connecting the bar to the carriage, releasable latch means for holding the bar in a disengaged position wherein said flat surface is longitudinally displaced from but close to said roll, and a second drive means for initially moving the bar longitudinally in a direction to engage said flat surface with the roll when the latch means is released.

10. Means as defined in claim 9 wherein said bar has a second flat surface on its opposite side parallel to the first and a second drive roll engageable with and disengageable from said second flat surface simultaneously with the first mentioned roll by such longitudinal movement of the bar.

11. Means as defined in claim 9 wherein said second drive means is an air motor which exerts driving force on and throughout the travel of the bar in both directions.

References Cited

UNITED STATES PATENTS

| | | | |
|---|---|---|---|
| 153,709 | 8/1874 | Granville | 92—178 X |
| 817,381 | 4/1906 | Matson | 92—165 |
| 2,578,825 | 12/1951 | Mirfield et al. | 83—311 |
| 2,746,126 | 5/1956 | Talbot | 83—311 |

JAMES M. MEISTER, Primary Examiner

U.S. Cl. X.R.

83—295, 318; 92—143; 173—156

UNITED STATES PATENT OFFICE
CERTIFICATE OF CORRECTION

Patent No. 3,460,421                                         August 12, 1969

Alexander Borzym

It is certified that error appears in the above identified patent and that said Letters Patent are hereby corrected as shown below:

Column 2, line 52, "designaed" should read -- designated --; line 64, "inturn" should read -- in turn --; line 70, "bearing" should read -- bearings --. Column 3, line 56, "rolers" should read -- rollers --. Column 5, line 49, "movemnt" should read -- movement --. Column 6, line 6, "latcth" should read -- latch --. Column 8, line 3, claim reference numeral "5" should read -- 2 --.

Signed and sealed this 21st day of April 1970.

(SEAL)
Attest:

Edward M. Fletcher, Jr.                                  WILLIAM E. SCHUYLER, JR.
Attesting Officer                                              Commissioner of Patents